(12) United States Patent
Repa et al.

(10) Patent No.: US 12,047,626 B2
(45) Date of Patent: *Jul. 23, 2024

(54) METHOD AND APPARATUS FOR FACILITATING AN ADDRESSABLE TARGETING OF CONTENT IN ACCORDANCE WITH A DE-DUPLICATED REACH METRIC

(71) Applicant: Microsoft Technology Licensing, LLC, Redmond, WA (US)

(72) Inventors: Julia Susan Repa, New York, NY (US); Christopher John Patrick White, Maplewood, NJ (US)

(73) Assignee: Microsoft Technology Licensing, LLC, Redmond, WA (US)

(*) Notice: Subject to any disclaimer, the term of this patent is extended or adjusted under 35 U.S.C. 154(b) by 98 days.

This patent is subject to a terminal disclaimer.

(21) Appl. No.: 17/534,666

(22) Filed: Nov. 24, 2021

(65) Prior Publication Data

US 2022/0086514 A1 Mar. 17, 2022

Related U.S. Application Data

(63) Continuation of application No. 16/743,017, filed on Jan. 15, 2020, now Pat. No. 11,218,756.

(51) Int. Cl.
*H04N 21/254* (2011.01)
*H04N 21/258* (2011.01)
(Continued)

(52) U.S. Cl.
CPC ... *H04N 21/2542* (2013.01); *H04N 21/25883* (2013.01); *H04N 21/44204* (2013.01);
(Continued)

(58) Field of Classification Search
CPC ......... H04N 21/4667; H04N 21/44204; H04N 21/2542; H04N 21/25816;
(Continued)

(56) References Cited

U.S. PATENT DOCUMENTS 10,796,333 B1 10/2020 Parekh et al.
10,956,934 B2 3/2021 Zhu et al.
(Continued)

*Primary Examiner* — Ngoc K Vu
(74) *Attorney, Agent, or Firm* — Calfee, Halter & Griswold LLP

(57) ABSTRACT

Aspects of the subject disclosure may include, for example, determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification. Other embodiments are disclosed.

20 Claims, 9 Drawing Sheets

(51) Int. Cl.
    *H04N 21/442*     (2011.01)
    *H04N 21/466*     (2011.01)
    *H04N 21/472*     (2011.01)
    *H04N 21/8355*     (2011.01)

(52) U.S. Cl.
    CPC ... *H04N 21/4667* (2013.01); *H04N 21/47211* (2013.01); *H04N 21/8355* (2013.01)

(58) Field of Classification Search
    CPC ....... H04N 21/47211; H04N 21/47815; H04N 21/8355; H04N 21/25883; H04N 21/84
    See application file for complete search history.

(56) References Cited

U.S. PATENT DOCUMENTS

| | | | |
|---|---|---|---|
| 11,218,756 B2 * | 1/2022 | Repa | H04N 21/8355 |
| 2010/0037255 A1 | 2/2010 | Sheehan et al. | |
| 2014/0237498 A1 | 8/2014 | Ivins | |
| 2016/0171537 A1 * | 6/2016 | Fanous | G06F 16/9537 |
| | | | 705/14.53 |
| 2017/0026678 A1 * | 1/2017 | Smith | H04N 21/482 |
| 2017/0098246 A1 | 4/2017 | Vasudevan et al. | |
| 2017/0308925 A1 | 10/2017 | Schneider et al. | |
| 2018/0084308 A1 * | 3/2018 | Lopatecki | H04H 60/82 |
| 2018/0286000 A1 | 10/2018 | Berry, Jr. et al. | |
| 2019/0199774 A1 | 6/2019 | Demsey et al. | |
| 2021/0133203 A1 * | 5/2021 | Rajavel | G06F 9/54 |
| 2021/0219006 A1 | 7/2021 | Repa et al. | |

\* cited by examiner

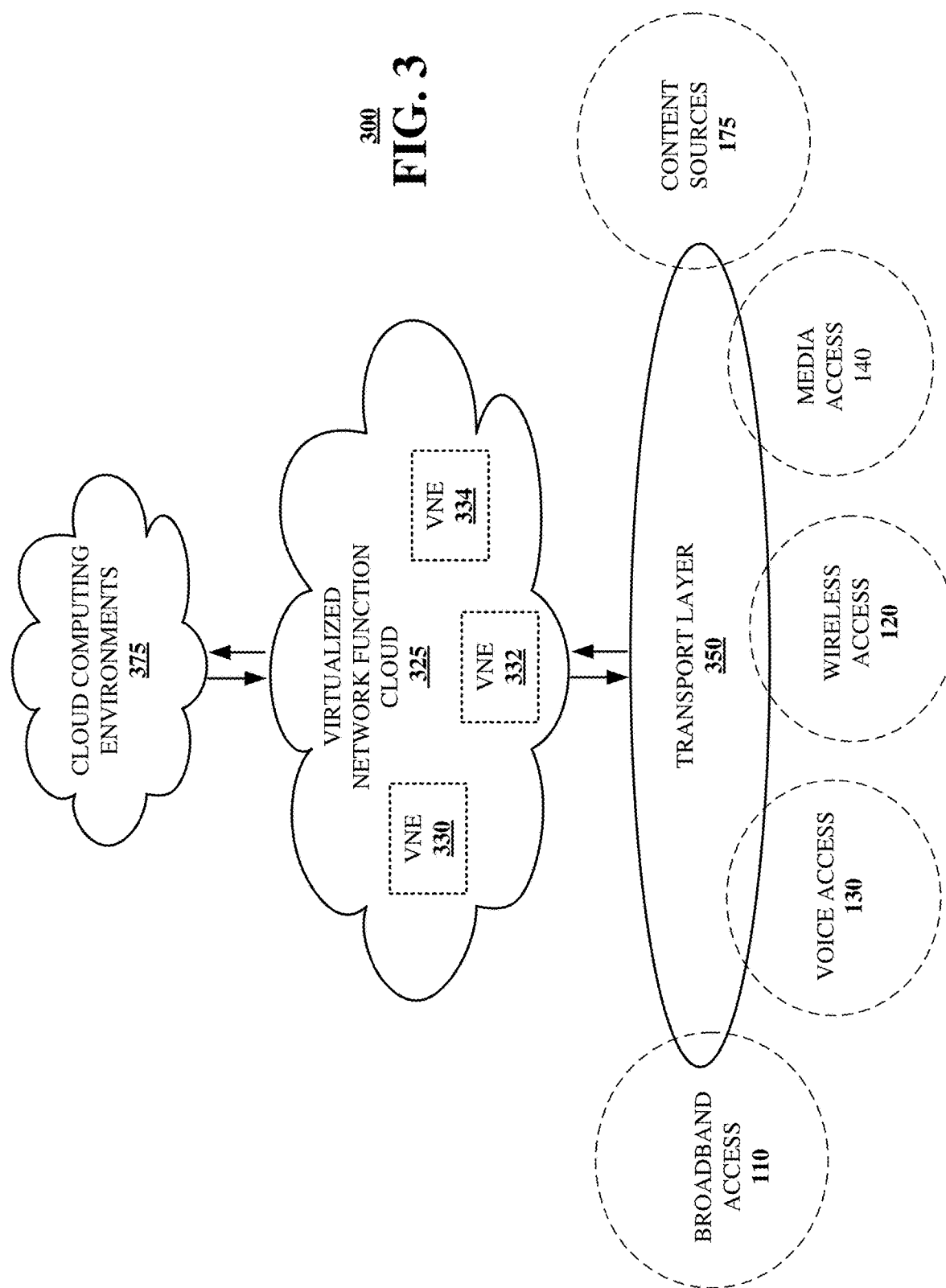

METHOD AND APPARATUS FOR FACILITATING AN ADDRESSABLE TARGETING OF CONTENT IN ACCORDANCE WITH A DE-DUPLICATED REACH METRIC

CROSS REFERENCE TO RELATED APPLICATIONS

This application is a continuation of U.S. patent application Ser. No. 16/743,017 filed on Jan. 15, 2020. The contents of each of the foregoing is/are hereby incorporated by reference into this application as if set forth herein in full.

FIELD OF THE DISCLOSURE

The subject disclosure relates to a method and apparatus for facilitating an addressable targeting of content in accordance with a de-duplicated reach metric.

BACKGROUND

As the world continues to become increasingly connected via communication devices and networks, additional opportunities are provided for service providers and network operators to reach consumers of content. A service/content provider or network operator that is hosting content via a platform (e.g., a website, an application, a channel, etc.) may make a portion of the platform available to buyers. For example, a portion of a platform may be allocated to inventory that may be purchased by a buyer. In many instances, the buyer may seek to purchase/bid on the inventory to promote products or services that are provided/sponsored by the buyer. In this respect, the buyer may provide advertisements for purposes of populating the inventory.

In some instances, a potential buyer of inventory might not be particularly interested in repetitively reaching the same audience of users/potential consumers. For example, given a limited amount of resources (e.g., a limited budget), it might not be a prudent use of the resources for a given advertisement to reach a same, first audience (e.g., a first household) multiple times, while not reaching a different, second audience (e.g., a second household) at all. Further complicating matters, the use/availability of multiple platforms represents challenges to the buyer in terms of knowing whether the given advertisement has reached different audiences. For example, the first household described above may subscribe to multiple platforms, where each of the platforms may assign its own unique username, handle, account number, or the like, to the first household. Absent more, delivery of the given advertisement to the first household over/via the multiple platforms may make it appear to, e.g., the buyer or network operator/service provider as if the given advertisement was provided to multiple, different households.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
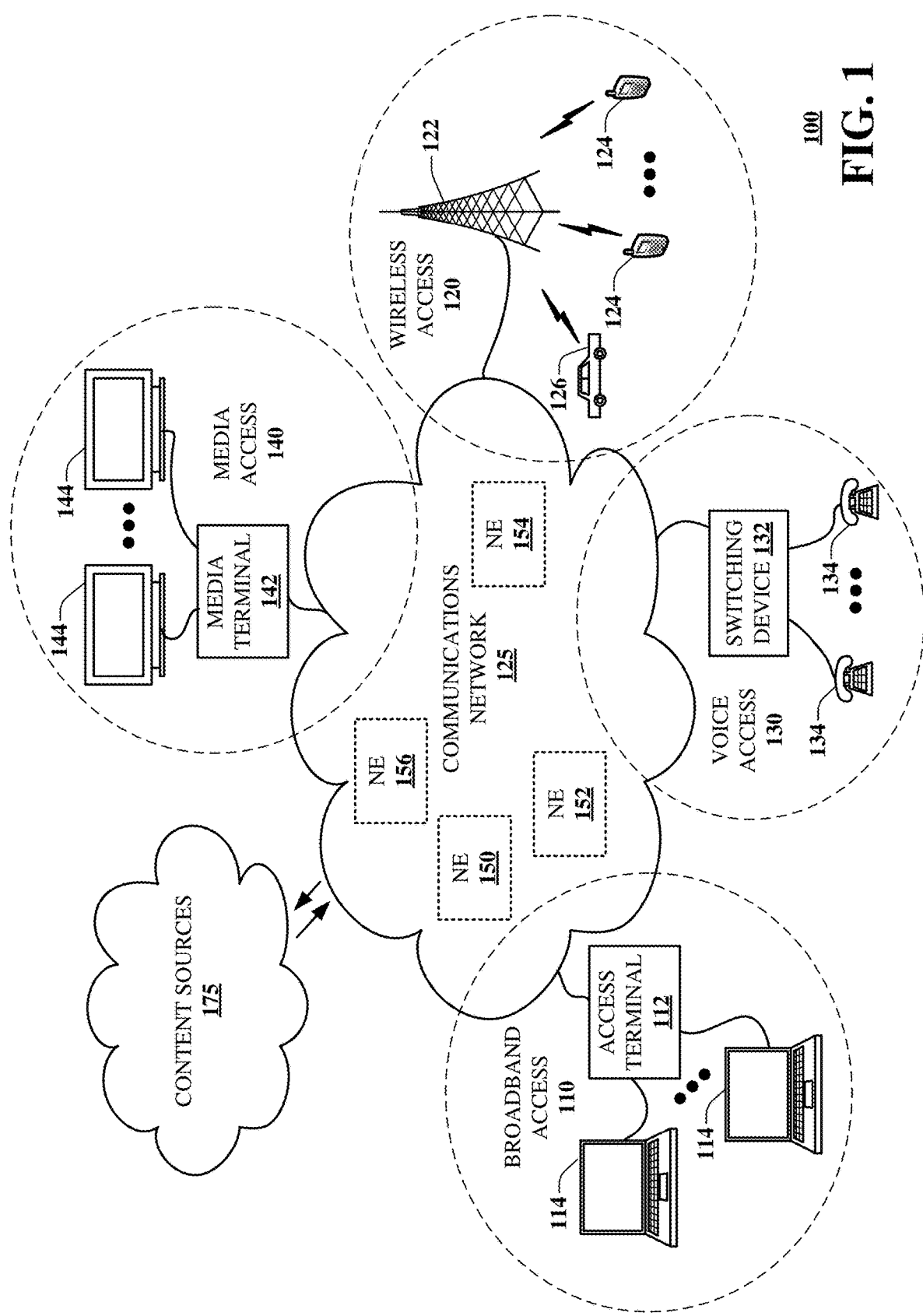
FIG. 1 is a block diagram illustrating an exemplary, non-limiting embodiment of a communications network in accordance with various aspects described herein.

The subject disclosure describes, among other things, illustrative embodiments for selecting one or more content items to be delivered to an addressable segment of users via one or more platforms. A common identification may be assigned to each of the platforms. A log may be generated to record the delivery of the content items. In some embodiments, multiple deliveries may be recorded as a single delivery in the log. Other embodiments are described in the subject disclosure.

One or more aspects of the subject disclosure include obtaining an indication of inventory available on a plurality of platforms, where the plurality of platforms each provide media to an addressable segment of users, obtaining a first identification associated with a first platform of the plurality of platforms and a second identification associated with a second platform of the plurality of platforms, wherein each of the first identification and the second identification are associated with an addressable user included in the addressable segment of users, generating a third identification that maps to each of the first identification and the second identification, obtaining an indication of a plurality of content items that are available to consume the inventory, selecting at least one content item included in the plurality of content items to deliver to the addressable user, and delivering the at least one content item to the addressable user in accordance with the third identification.

One or more aspects of the subject disclosure include obtaining a first identification associated with a first platform and a second identification associated with a second platform, wherein each of the first identification and the second identification are associated with an addressable user, generating a third identification that maps to each of the first identification and the second identification, obtaining an indication of a first plurality of content items that are available to consume first inventory available via the first platform and the second platform, selecting a first content item included in the first plurality of content items to deliver to the addressable user, delivering the first content item to the addressable user in accordance with the third identification to consume the first inventory, and generating a log to record the delivering of the first content item to the addressable user, wherein the log includes the third identification, a fourth identification that identifies the first content item, and a timestamp that is representative of when the first content item was delivered to the addressable user.

One or more aspects of the subject disclosure include determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification.

Referring now to FIG. 1, a block diagram is shown illustrating an example, non-limiting embodiment of a communications network 100 in accordance with various aspects described herein. For example, communications network 100 can facilitate in whole or in part obtaining an indication of inventory available on a plurality of platforms, where the plurality of platforms each provide media to an addressable segment of users, obtaining a first identification associated with a first platform of the plurality of platforms and a second identification associated with a second platform of the plurality of platforms, wherein each of the first identification and the second identification are associated with an addressable user included in the addressable segment of users, generating a third identification that maps to each of the first identification and the second identification, obtaining an indication of a plurality of content items that are available to consume the inventory, selecting at least one content item included in the plurality of content items to deliver to the addressable user, and delivering the at least one content item to the addressable user in accordance with the third identification. Communications network 100 can facilitate in whole or in part obtaining a first identification associated with a first platform and a second identification associated with a second platform, wherein each of the first identification and the second identification are associated with an addressable user, generating a third identification that maps to each of the first identification and the second identification, obtaining an indication of a first plurality of content items that are available to consume first inventory available via the first platform and the second platform, selecting a first content item included in the first plurality of content items to deliver to the addressable user, delivering the first content item to the addressable user in accordance with the third identification to consume the first inventory, and generating a log to record the delivering of the first content item to the addressable user, wherein the log includes the third identification, a fourth identification that identifies the first content item, and a timestamp that is representative of when the first content item was delivered to the addressable user. Communications network 100 can facilitate in whole or in part determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification.

As shown in FIG. 1, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
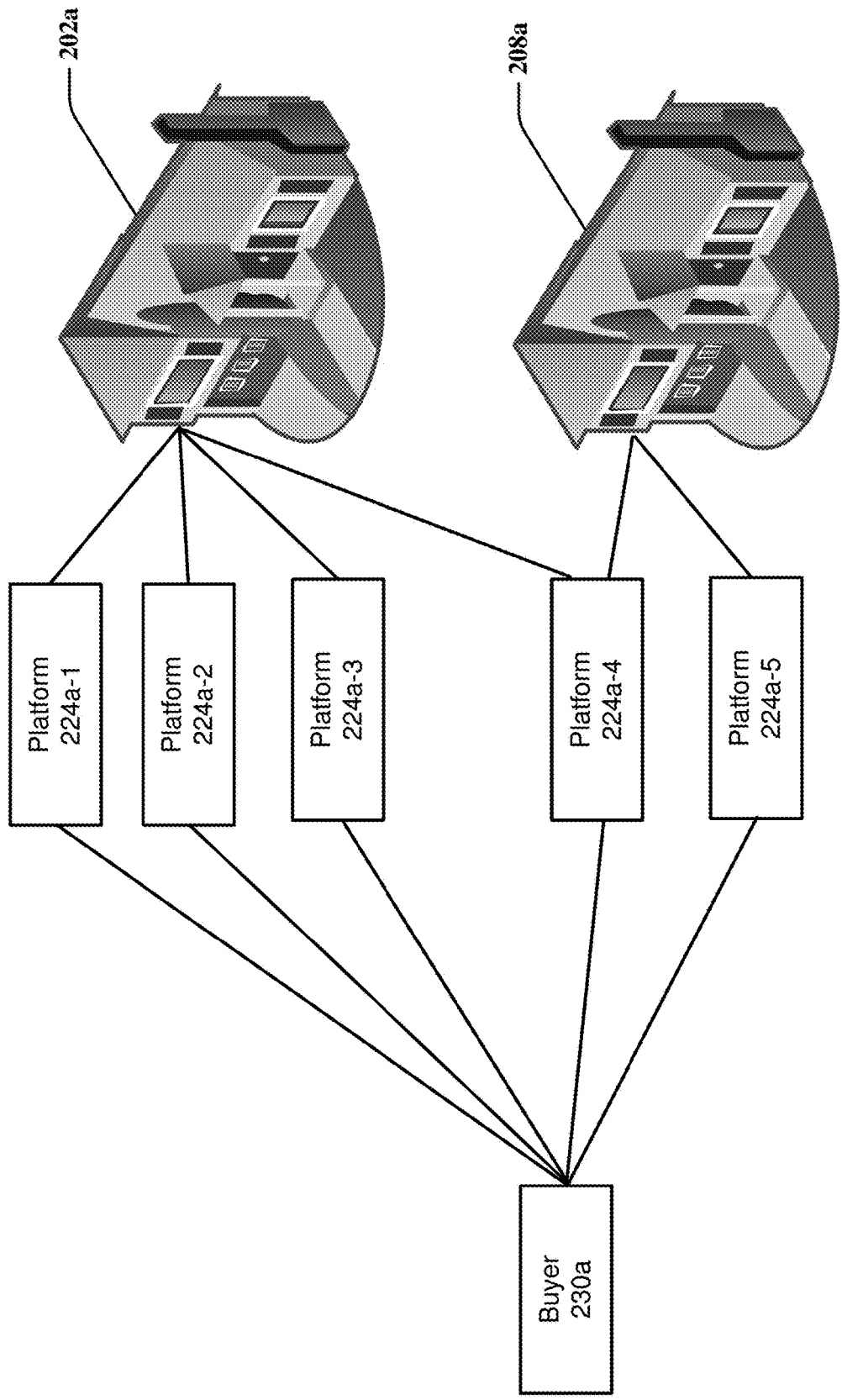
FIGS. 2A-2B and 2D are block diagrams illustrating example, non-limiting embodiments of systems functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. The system 200a may be associated with an addressable segment of users/consumers of content. To demonstrate, the system 200a shows a first household 202a and a second household 208a. While two households are shown in FIG. 2A, in some embodiments a different count/number of households may be included. For example, in many embodiments hundreds or even thousands of households may be included. Still further, in some embodiments a given structure (e.g., a condominium, an apartment building, etc.) may host multiple households. As the term is used herein, a household may represent an addressable segment of users. In many instances, and without limitation, a household may be composed of multiple people that may be associated with each other via various relationships (e.g., a familial relationship, friendship, etc.).

As shown in FIG. 2A, each of the first household 202a and the second household 208a may access content (e.g., media) via one or more platforms. For example, the first household 202a may access content via one or more of a first platform 224a-1, a second platform 224a-2, a third platform 224a-3, and a fourth platform 224a-4. Similarly, the second household 208a may access content via one or both of the fourth platform 224a-4 and a fifth platform 224a-5.

A platform (e.g., one or more of the first platform 224a-1 through the fifth platform 224a-5) may include/incorporate hardware, software, firmware, or any combination thereof, that may be utilized to provision content to a respective household. In some embodiments, a platform may include, or be associated with, a website, an application, a channel, a service (e.g., a streaming audio or video service), a game, a contest, one or more communication sessions, etc. In some embodiments, a platform may facilitate a distribution of content via one or more types/kinds of distribution models, such as for example a broadcast distribution model, a multicast distribution model, a unicast distribution model, etc. A given platform may be used to distribute live content and/or previously-recorded content.

In some embodiments, one or more of the platforms of FIG. 2A may be associated with an account that the given household subscribes to. For example, the household may pay a subscription/license fee (or the like) in order to obtain (e.g., receive) access to content via a given platform. A sponsor/provider of a given platform may distinguish the households from one another via a unique identifier, username, handle, log-in, account number, or the like. For example, the fourth platform 224a-4 may: (1) assign a household identifier of HHID1 to the first household 202a, and (2) assign a household identifier of HHID2 to the second household 208a. In contrast, the first platform 224a-1 may assign a household identifier of HHID27 to the first household 202a. As this illustrative example demonstrates, a same household (e.g., the first household 202a in this example) may have different identifiers (e.g., HHID1 and HHID27 in this example) assigned by different platforms (e.g., the fourth platform 224a-4 and the first platform 224a-1 in this example).

A (potential) buyer (e.g., buyer 230a of FIG. 2A) of inventory hosted by the platforms 224a-1 through 224a-5 may desire to target each of the households (e.g., the first household 202a and the second household 208a) of the system 200a a maximum number of times, perhaps due to limited resources or other considerations. Continuing the above-mentioned example, and absent more, it may appear to, e.g., the buyer 230a that a delivery of an advertisement sponsored by the buyer 230a to the first household 202a via, e.g., the first platform 224a-1 (with household identifier HHID27) and the fourth platform 224a-4 (with household identifier HHID1) represents reaching two unique/distinct households, when in fact that delivery only reached a single household (namely, the first household 202a in this example).

Accordingly, aspects of the disclosure may facilitate an identification of households that receive content via multiple platforms, such that buyers and platform operators/providers may be able to identify when content (e.g., an advertisement) reaches a given household via a given platform. Analogously, from an accounting perspective, reaching a given household with content via multiple platforms may result in the delivery or impression (only) being counted once. This aspect of eliminating redundancy in the delivery (due to the presence/use of multiple platforms mapping to a given household) may be referred to herein as a de-duplication in terms of reaching an addressable target (e.g., a household) with content (e.g., an advertisement). In some embodiments, de-duplication may take into consideration an amount of time that elapses between reaching the given household. For example, if more than a threshold amount of time elapses between two deliveries of a given content item, it may be appropriate to count both deliveries as having occurred. Conversely, if less than the threshold amount of time elapses between the two deliveries of the given content item, it may be appropriate to only count one of the deliveries (e.g., the first of the two deliveries) as having occurred.

To facilitate the de-duplication described above, and referring to FIG. 2B (which illustrates a system 200b that incorporates aspects of the system 200a of FIG. 2A), the sponsors/operators/providers of the platforms 224a-1 through 224a-5 may provide personally identifying information (PII) associated with households that utilize (e.g., subscribe to) the respective platform to a data partner database 228b. The PII may include the household identifier (e.g., an account number) that the platform has assigned to the household (e.g., HHID1 as assigned by the fourth platform 224a-4 to the first household 202a in the example set forth above), as well as other information such as a billing address, a service address, an email address, a name, a phone number, etc. In this regard, the PII may include information that is customarily/typically provided in a billing statement (e.g., a monthly or annual billing statement) to a subscriber of a service.

In some embodiments, the PII may include an identification of one or more devices that are authorized to access the respective platform. For example, the PII may include a MAC address or a serial number of a given communication device associated with a household that accesses the platform. To the extent that a device identifier is dynamic in nature, such as for example a dynamically-assigned Internet Protocol (IP) address, that dynamic identifier may be associated/linked/mapped to the household identifier assigned by the platform as part of the PII.

The data partner database 228b (or, analogously, a data partner operator/provider of the data partner database 228b) may aggregate PII's across/from some or all of the platforms 224a-1 through 224a-5 and may assign a data partner identifier to each household. For example, the data partner database 228b may assign a first data partner identifier of DPID1 to the first household 202a and a second data partner identifier of DPID2 to the second household 208a. Thus, at the data partner database 228b, each of the household identifier HHID1 (of the fourth platform 224a-4) and the household identifier HHID27 (of the first platform 224a-1) may map/correspond to the first data partner identifier of DPID1.

One or more of the platforms 224a-1 through 224a-5 may provide the PII to the data partner database 228b periodically (e.g., monthly). In some embodiments, a given platform may provide its PII to the data partner database 228b in response to an occurrence of one or more events or conditions (e.g., a household enrolling with the given platform or a household having service suspended due to a lack of payment of a subscription/license fee to the given platform). In some embodiments, a given platform may provide its PII to the data partner database 228b in response to one or more user-generated inputs (at, e.g., the data partner database 228b, the given platform, or a user device).

Figure 2B:
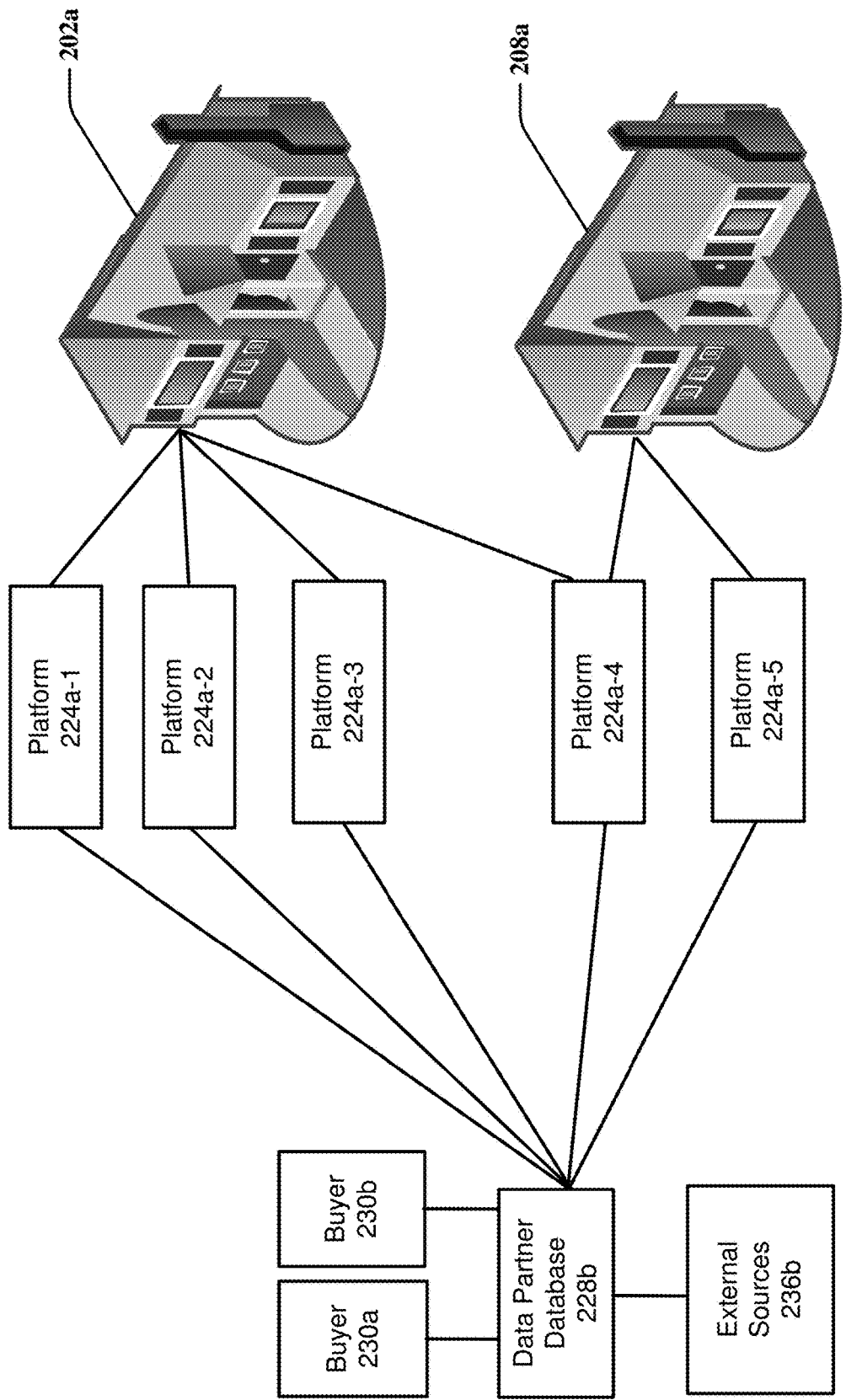

In some embodiments, the data partner database 228b may receive additional information from external sources 236b as shown in FIG. 2B. The external sources 236b may include, without limitation, user profiles on social media platforms/sites, information from public databases (e.g., publicly accessible tax information, recorded housing deeds or contracts pertaining to real estate transfers, etc.), employment records, school/educational records, etc. The additional information provided by the external sources 236b to the data partner database 228b may identify demographic information (e.g., age, race, nationality, sex, etc.), hobbies/activities, occupations (e.g., employment status, full-time/part-time student status, etc.), etc., associated with users/inhabitants of a given household. The additional information may be used to enrich the set of data available at the data partner database 228b for a given household. For example, and as one skilled in the art will appreciate based on a review of this disclosure, the additional information provided by the external sources 236b may enhance a selection/targeting of advertisements with respect to particular household given identifiable characteristics associated with the inhabitants of the particular household. For a given advertising campaign sponsored by the buyer 230a, a limited set of resources (e.g., a finite budget) available to the buyer 230a may be expended efficiently by the buyer 230a in accordance with the information that is available at the data partner database 228b.

In some embodiments, the buyer 230a may submit content (e.g., one or more advertisements) to the data partner database 228b along with characteristics associated with a target user audience. The data partner database 228b may attempt to match the characteristics received from the buyer 230a with characteristics associated with the households (as represented by the PII obtained from the platforms 224a-1 through 224a-5 and/or the external sources 236b), where the closet match (or closest set of matches) may influence a selection and delivery of the content (e.g., a particular advertisement) to the respective household(s).

In some embodiments, the data partner database 228b (or, analogously, a data partner associated with the data partner database 228b) may solicit bids from one or more of the platforms 224a-1 through 224a-5 on behalf of the buyer 230a. For example, assuming that the characteristics of the (inhabitants of the) first household 202a are such that an advertisement sponsored by the buyer 230a would likely appeal to the (inhabitants of the) first household in an amount greater than a threshold, the data partner database 228b may select the first platform 224a-1 to deliver the advertisement to the first household 202a if, for example (and assuming all other conditions being equal), the bid provided by the first platform 224a-1 was less than the respective bids provided by each of the platforms 224a-2 through 224a-4. In this respect, in some embodiments the data partner database 228b may operate/act/serve as an agent/proxy on behalf of the buyer 230a in order to identify one or more optimum platforms to service (e.g., provide) advertisements sponsored by the buyer 230a.

In some embodiments, the data partner database 228b (or, analogously, a data partner associated with the data partner database 228b) may solicit bids from one or more buyers (e.g., buyers 230a and 230b of FIG. 2B) on behalf of a particular platform (e.g., the first platform 224a-1). For example, the data partner database 228b may select an advertisement of the buyer 230a for the first platform 224a-1 to provide/deliver to the first household 202a if, for example and assuming all other conditions being equal (such as for example respective characteristics of the advertisements provided by each of the buyers 230a and 230b matching characteristics of inhabitants of the first household 202a in an equal amount), the bid provided by the buyer 230a was less than the bid provided by the buyer 230b. In this respect, in some embodiments the data partner database 228b may operate/act/serve as an agent/proxy on behalf of the first platform 224a-1 in order to identify one or more optimum advertisements to be delivered/served/provided by the first platform 224a-1.

As the foregoing examples demonstrate, in some embodiments the data partner database 228b may serve as an agent/proxy on behalf of one or more buyers or one or more platforms. In some embodiments, the data partner database 228b may act as an intermediary between buyers and platforms with an overall goal/objective of maximizing, e.g., revenue or profits in the system 200b when considered as a whole. Stated differently, in some embodiments the data partner database 228b may take into consideration competing interests of both buyers and platforms when selecting one or more advertisements sponsored by buyers to be provided to households via one or more platforms.

Once a particular content item (e.g., advertisement) provided by a particular buyer has been selected for delivery to a particular household via a particular platform, the particular advertisement may be delivered/provided to that particular household. The data partner database 228b may generate a log/memo regarding the delivery. The log may include one or more of: (1) a first identifier/identification that identifies the content item, (2) a second identifier/identification that identifies the buyer, (3) a third identifier/identification that identifies the household (e.g., a data partner identifier as described above), (4) a fourth identifier/identification that identifies the platform, (5) a fifth identifier/identification that identifies the (communication) device associated with the household that the content item was delivered to, and (6) a timestamp (e.g., a date and a time) representative of when the content item was delivered to the household/device.

The log/memo generated by the data partner database 228b may serve as a record for purposes of billing the buyer for delivering the particular content item to the particular household. The log/memo generated by the data partner database 228*b* may also serve as a historical record that may be consulted when selecting sponsored content items for delivery in the future. For example, if the log reflects that the particular content item was previously delivered to the particular household on a first day, then the particular content item might not be delivered to that same particular household on a second day that is subsequent to the first day (or may be delivered to the particular household if the second day is a threshold number of days later than the first day).

In some embodiments, another entity (for example, a sales management platform) may perform some or all of the functions described above with respect to the data partner database 228*b* of FIG. 2B. For example, and referring to FIG. 2D, a system 200*d* (which incorporates aspects of the system 200*a* of FIG. 2A and the system 200*b* of FIG. 2B) is shown that includes a sales management platform 242*d*. The sales management platform 242*d* may be operative on data obtained from a data partner database 228*d* (where the data of the data partner database 228*d* may include some or all of the data of the data partner database 228*b* set forth above), one or more of the platforms 224*a*-1 through 224*a*-5, or any combination thereof. As represented in FIG. 2D, the data partner database 228*d* may obtain at least a portion of the data that it provides to the sales management platform 242*d* from the external sources 236*b*. In this respect, in some embodiments the sales management platform 242*d* may obtain data from the external sources indirectly, e.g., by way of the data partner database 228*d*. The data partner database 228*d* may process (e.g., filter) the data it obtains from the external sources 236*b* before providing such data to the sales management platform 242*d*.

In some embodiments, the sales management platform 242*d* may serve as a broker or intermediary between buyers and sellers of inventory. The sales management platform 242*d* may be operative in accordance with one or more models and/or algorithms. For example, the sales management platform 242*d* may incorporate aspects of bid-driven and/or pre-negotiated models. In some embodiments, the sales management platform 242*d* may incorporate aspects of machine learning (ML) and/or artificial intelligence (AI) to facilitate a negotiation between buyers and sellers of inventory.

Figure 2C:
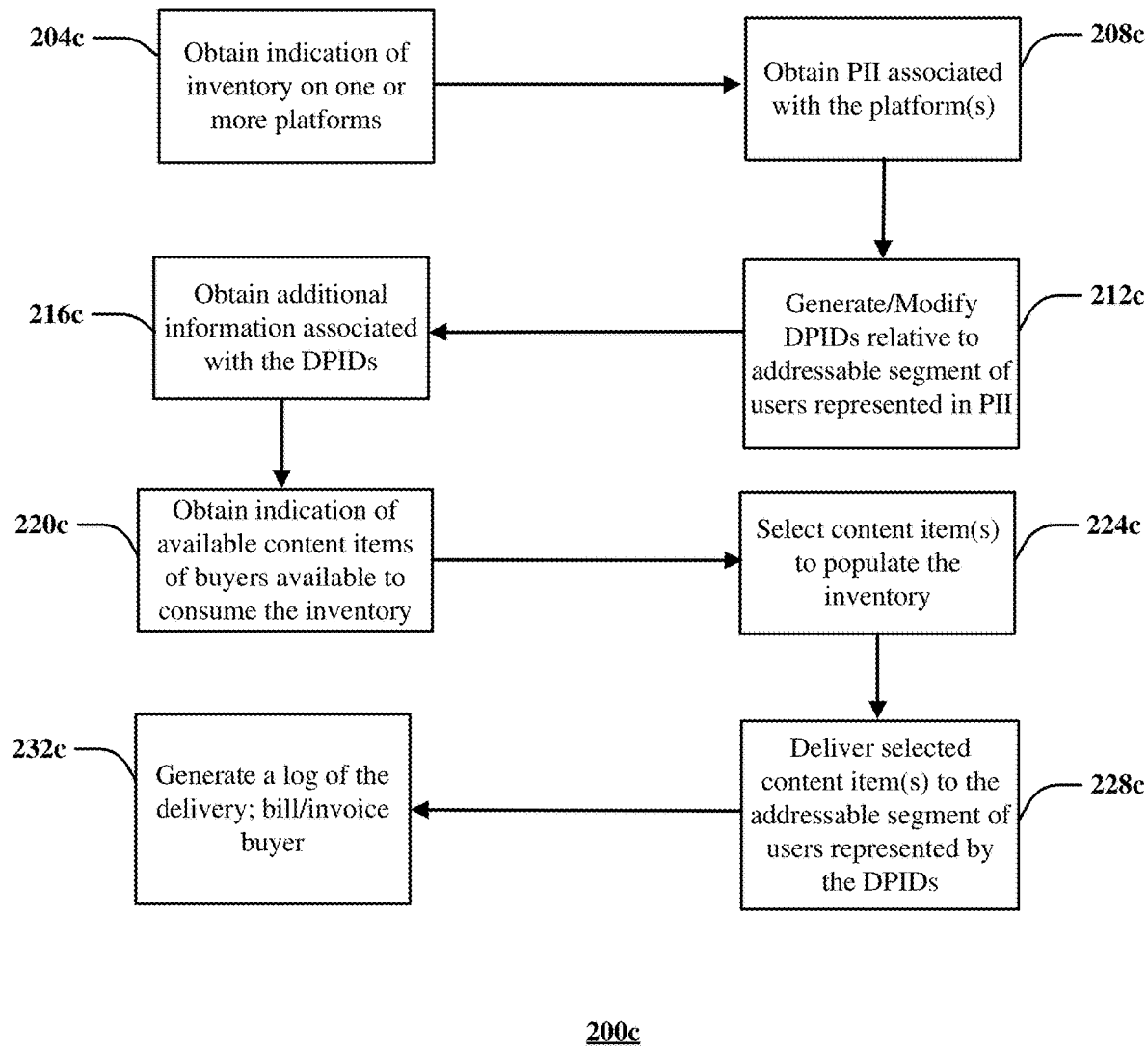
FIG. 2C depicts an illustrative embodiment of a method in accordance with various aspects described herein.
Figure 2D:
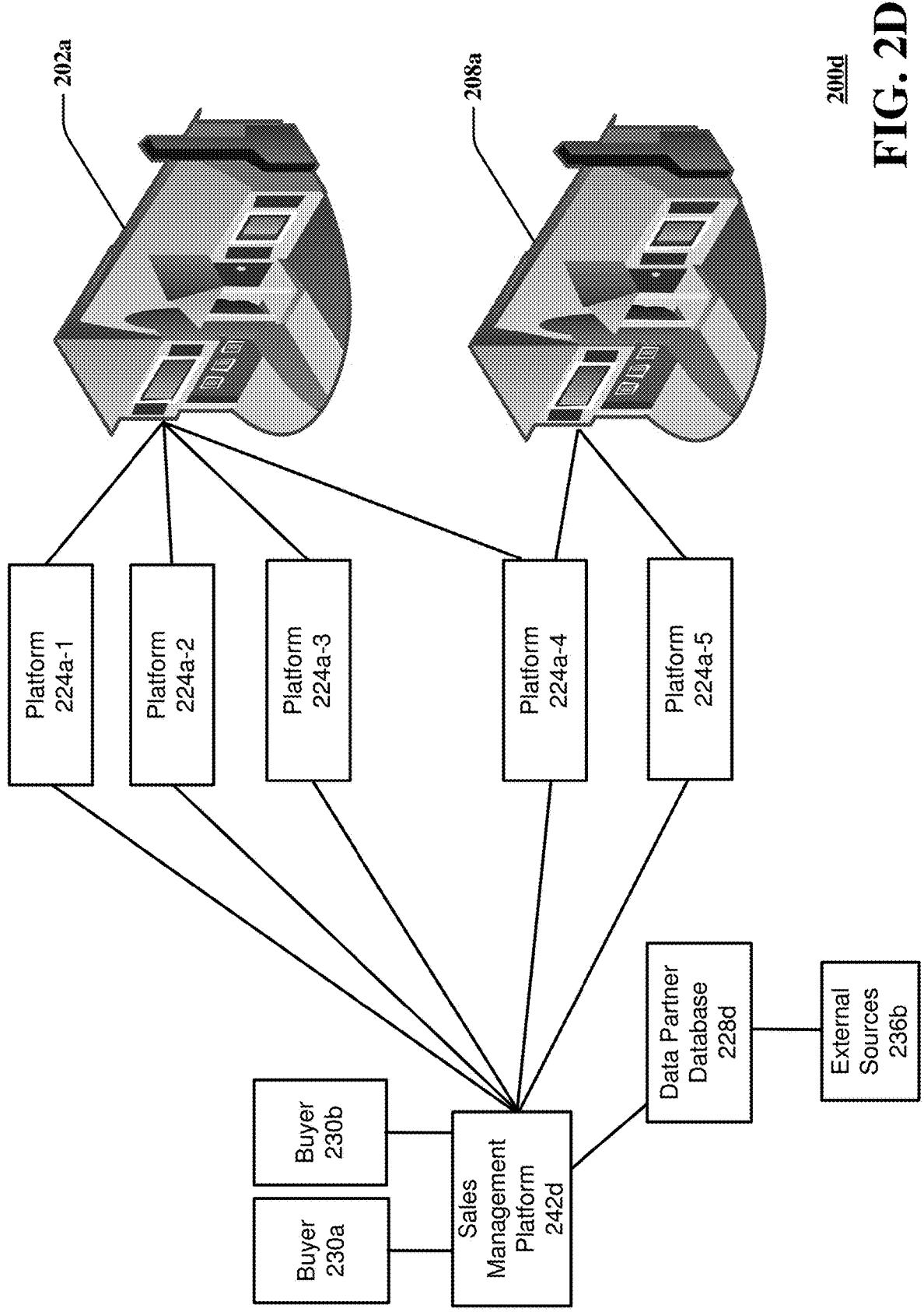

FIG. 2C depicts an illustrative embodiment of a method 200*c* in accordance with various aspects described herein. The method 200*c* may be executed in conjunction with one or more of the systems, devices, and/or components described herein. In some embodiments, the method 200*c* may be executed to select a content item to be delivered to an addressable segment of users, such as for example one or more households. A log may be generated that represents a record of the delivery (e.g., a transmission) of the selected content item.

In block 204*c*, an indication of inventory that is available on one or more platforms may be obtained. For example, the inventory may correspond to commercial spots/breaks that are present in media being provided by the platform(s) to the addressable segment of users. Block 204*c* may include obtaining parameters associated with the inventory, such as for example a minimum price that a platform is willing to accept for at least part of the inventory, a duration of the inventory, a specification of how long a bid opportunity will remain open/pending for the inventory, etc.

In block 208*c*, personally identifying information (PII) associated with the platform(s) of block 204*c* may be obtained. For example, and as described above, the PII may identify accounts/households that are subscribed to a given platform, as well as other service/billing related information.

In block 212*c*, a data partner identifier (DPID) may be generated for each unique addressable segment of users represented in the PII of block 208*c*. For example, to the extent that a given addressable user (e.g., a given household) utilizes multiple platforms (where at least two of the platforms utilize a different identifier for the given addressable segment) as represented in the PII for that given addressable user, the various platform-based identifiers may be mapped to the DPID. To the extent that a DPID already exists for the given addressable user, block 212*c* may entail incorporating any updates/modifications to that DPID as represented in/by the PII of block 208*c*.

In block 216*c*, additional information associated with the DPID of block 212*c* may be obtained. For example, block 216*c* may entail obtaining the additional information from the external sources 236*b* of FIG. 2B described above.

In block 220*c*, an indication of content items provided by (potential/candidate) buyers that are available for populating the inventory (of block 204*c*) may be obtained. Block 220*c* may include obtaining parameters associated with the content items, such as for example a maximum price that a buyer is willing to pay for buying at least part of the inventory, a duration of the offer to buy the inventory, a target demographic that the buyer is attempting to reach with a particular content item offered by the buyer, etc.

In block 224*c*, one or more of the content items of block 220*c* may be selected to populate the inventory of block 204*c*. The selection of block 224*c* may incorporate aspects of contract law, where the selection of block 224*c* may represent a binding agreement between the buyers providing the selected content items and the platforms hosting the available inventory. The selection of the content item(s) in block 224*c* may be based at least in part on the parameters of the inventory obtained as part of block 204*c*, the additional information obtained in block 216*c*, the parameters of the content items obtained as part of block 220*c*, a prior execution of block 232*c* (described in further detail below), or any combination thereof.

In block 228*c*, the content item(s) selected as part of block 224*c* may be delivered to the addressable segment of users represented by the DPIDs of block 212*c*. The delivery may occur via one or more of the platforms.

In block 232*c*, a log/memo may be generated corresponding to the delivery of block 228*c*. As described above, a log of the delivery may be consulted as part of block 224*c* in conjunction with a selection of content items for delivery. To demonstrate, the log of block 232*c* may be consulted to avoid delivering a given content item to a particular addressable segment of users at an excessive rate/frequency (e.g., a rate/frequency that exceeds a threshold). The log 232*c* may also be generated in order to obtain a record that may be used for billing/invoicing the buyer(s) of the content item(s) delivered in block 228*c*. In this regard, block 232*c* may include billing/invoicing the buyer(s) in accordance with the log. To the extent that a given content item is delivered to an addressable user (as represented by a given DPID) included in the addressable segment of users over/via more than one platform, that delivery might only be counted once as part of the log of block 232*c* in some embodiments, which is to say that a single instance of the delivery may be recorded as part of the log.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Aspects of the method 200c may be executed iteratively/repeatedly in order to incorporate any updates/modifications to existing information, logs/records, databases, sources of data, etc. In this respect, as the method 200c is used in the selection and targeting of content items (e.g., advertisements), the method 200c may tend to become more accurate/pin-pointed over time, such that the selection process may obtain optimum efficiency. Stated slightly different, any error that may be associated with the selection (e.g., a mismatch between targeted demographics and the demographics of a recipient) may tend to decrease over time, such that the method 200c may become more accurate/precise in terms of the ability of the method 200c to select an appropriate advertisement for a given addressable user.

Aspects of this disclosure may be combined with aspects of pre-bidding with respect to, e.g., line items. In some embodiments, line items may include one or more content items, such as one or more advertisements. Aspects of this disclosure may further include management of such line items. Aspects of this disclosure may be combined with one or more aspects set forth in U.S. patent application Ser. No. 16/560,666 filed on Sep. 4, 2019, the contents of which are fully incorporated herein by reference. Various components and/or functions set forth in U.S. patent application Ser. No. 16/560,666 may be used in place of, or in conjunction with, the components and/or functions set forth herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200a, 200b, and 200d, and method 200c presented in FIGS. 1, 2A, 2B, 2C, and 2D. For example, virtualized communication network 300 can facilitate in whole or in part obtaining an indication of inventory available on a plurality of platforms, where the plurality of platforms each provide media to an addressable segment of users, obtaining a first identification associated with a first platform of the plurality of platforms and a second identification associated with a second platform of the plurality of platforms, wherein each of the first identification and the second identification are associated with an addressable user included in the addressable segment of users, generating a third identification that maps to each of the first identification and the second identification, obtaining an indication of a plurality of content items that are available to consume the inventory, selecting at least one content item included in the plurality of content items to deliver to the addressable user, and delivering the at least one content item to the addressable user in accordance with the third identification. Virtualized communication network 300 can facilitate in whole or in part obtaining a first identification associated with a first platform and a second identification associated with a second platform, wherein each of the first identification and the second identification are associated with an addressable user, generating a third identification that maps to each of the first identification and the second identification, obtaining an indication of a first plurality of content items that are available to consume first inventory available via the first platform and the second platform, selecting a first content item included in the first plurality of content items to deliver to the addressable user, delivering the first content item to the addressable user in accordance with the third identification to consume the first inventory, and generating a log to record the delivering of the first content item to the addressable user, wherein the log includes the third identification, a fourth identification that identifies the first content item, and a timestamp that is representative of when the first content item was delivered to the addressable user. Virtualized communication network 300 can facilitate in whole or in part determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
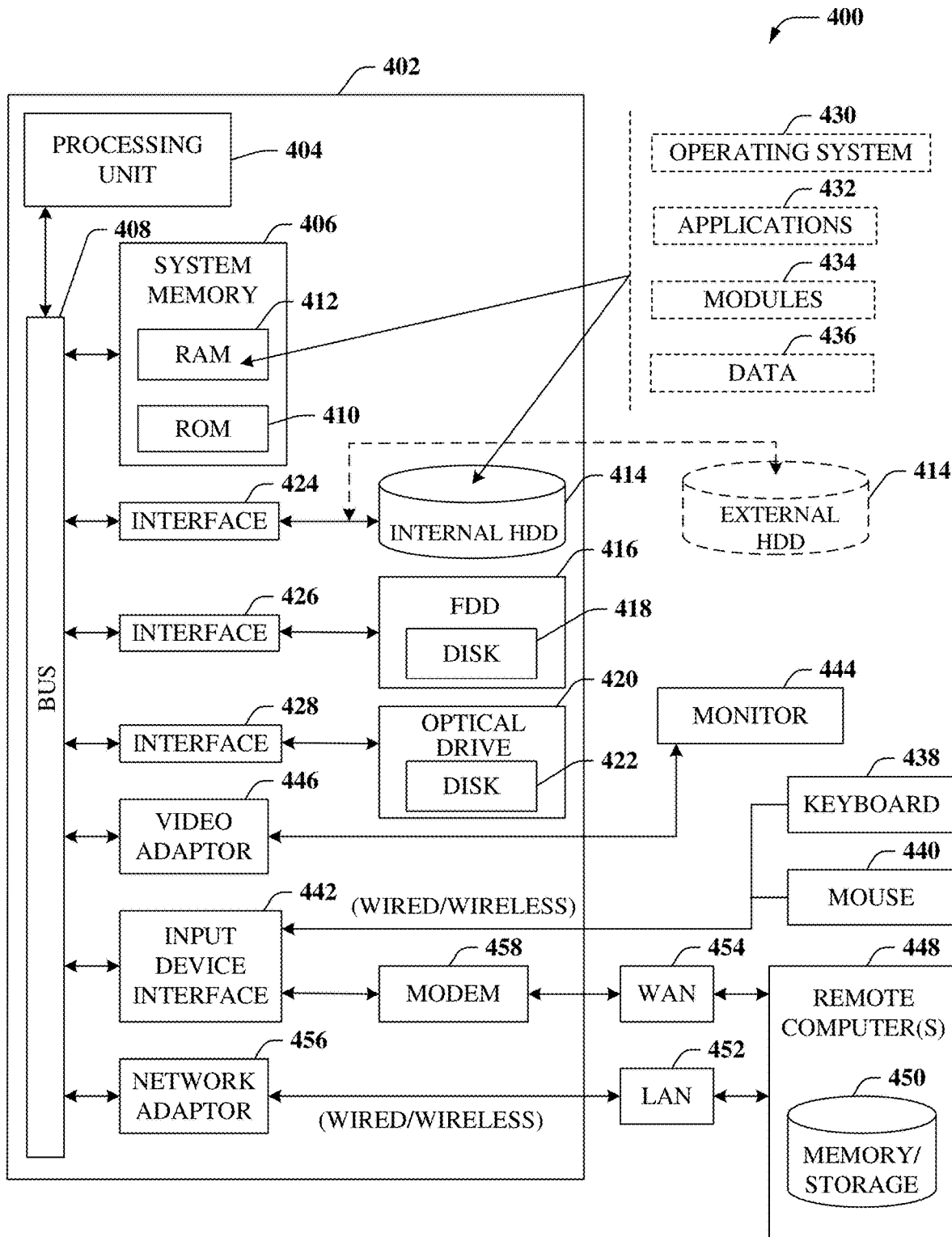
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining an indication of inventory available on a plurality of platforms, where the plurality of platforms each provide media to an addressable segment of users, obtaining a first identification associated with a first platform of the plurality of platforms and a second identification associated with a second platform of the plurality of platforms, wherein each of the first identification and the second identification are associated with an addressable user included in the addressable segment of users, generating a third identification that maps to each of the first identification and the second identification, obtaining an indication of a plurality of content items that are available to consume the inventory, selecting at least one content item included in the plurality of content items to deliver to the addressable user, and delivering the at least one content item to the addressable user in accordance with the third identification. Computing environment 400 can facilitate in whole or in part obtaining a first identification associated with a first platform and a second identification associated with a second platform, wherein each of the first identification and the second identification are associated with an addressable user, generating a third identification that maps to each of the first identification and the second identification, obtaining an indication of a first plurality of content items that are available to consume first inventory available via the first platform and the second platform, selecting a first content item included in the first plurality of content items to deliver to the addressable user, delivering the first content item to the addressable user in accordance with the third identification to consume the first inventory, and generating a log to record the delivering of the first content item to the addressable user, wherein the log includes the third identification, a fourth identification that identifies the first content item, and a timestamp that is representative of when the first content item was delivered to the addressable user. Computing environment 400 can facilitate in whole or in part determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
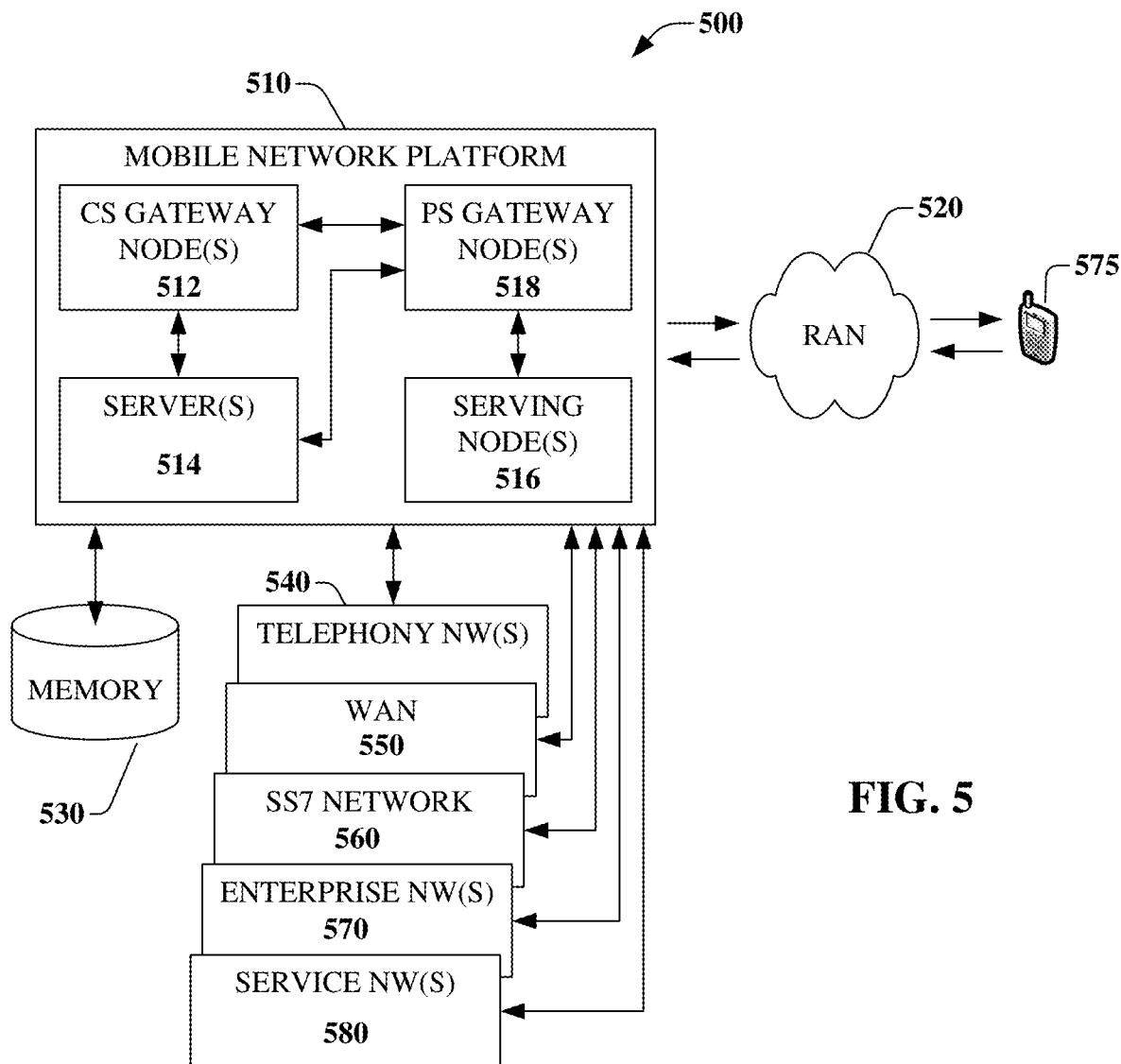
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining an indication of inventory available on a plurality of platforms, where the plurality of platforms each provide media to an addressable segment of users, obtaining a first identification associated with a first platform of the plurality of platforms and a second identification associated with a second platform of the plurality of platforms, wherein each of the first identification and the second identification are associated with an addressable user included in the addressable segment of users, generating a third identification that maps to each of the first identification and the second identification, obtaining an indication of a plurality of content items that are available to consume the inventory, selecting at least one content item included in the plurality of content items to deliver to the addressable user, and delivering the at least one content item to the addressable user in accordance with the third identification. Platform 510 can facilitate in whole or in part obtaining a first identification associated with a first platform and a second identification associated with a second platform, wherein each of the first identification and the second identification are associated with an addressable user, generating a third identification that maps to each of the first identification and the second identification, obtaining an indication of a first plurality of content items that are available to consume first inventory available via the first platform and the second platform, selecting a first content item included in the first plurality of content items to deliver to the addressable user, delivering the first content item to the addressable user in accordance with the third identification to consume the first inventory, and generating a log to record the delivering of the first content item to the addressable user, wherein the log includes the third identification, a fourth identification that identifies the first content item, and a timestamp that is representative of when the first content item was delivered to the addressable user. Platform 510 can facilitate in whole or in part determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
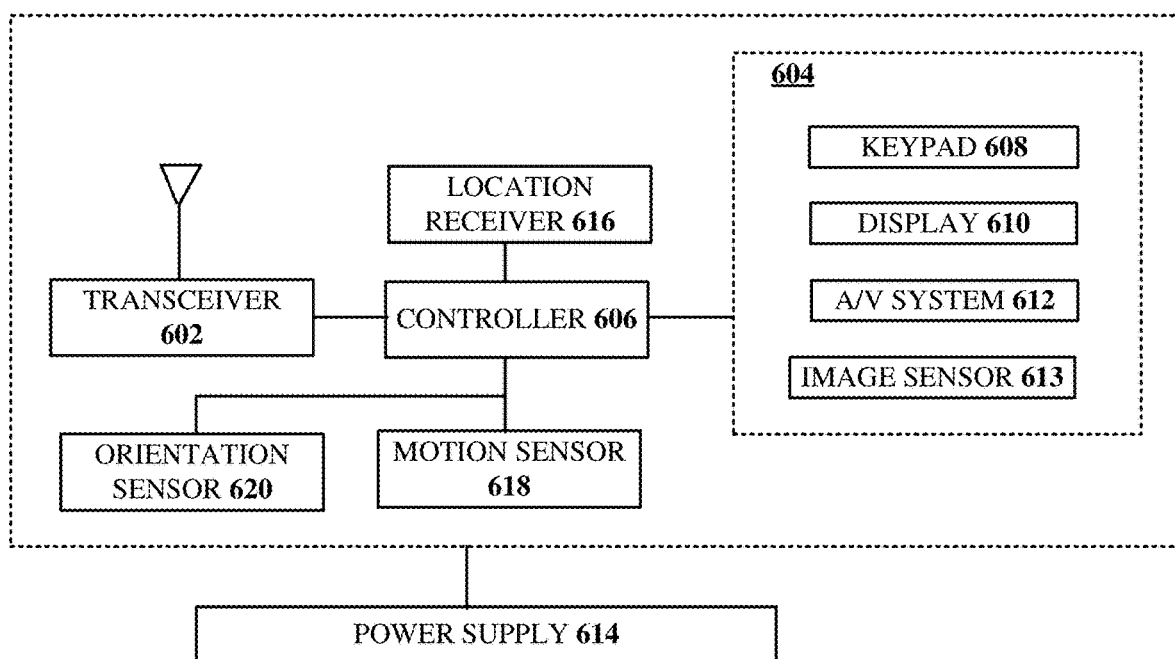
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining an indication of inventory available on a plurality of platforms, where the plurality of platforms each provide media to an addressable segment of users, obtaining a first identification associated with a first platform of the plurality of platforms and a second identification associated with a second platform of the plurality of platforms, wherein each of the first identification and the second identification are associated with an addressable user included in the addressable segment of users, generating a third identification that maps to each of the first identification and the second identification, obtaining an indication of a plurality of content items that are available to consume the inventory, selecting at least one content item included in the plurality of content items to deliver to the addressable user, and delivering the at least one content item to the addressable user in accordance with the third identification. Computing device 600 can facilitate in whole or in part obtaining a first identification associated with a first platform and a second identification associated with a second platform, wherein each of the first identification and the second identification are associated with an addressable user, generating a third identification that maps to each of the first identification and the second identification, obtaining an indication of a first plurality of content items that are available to consume first inventory available via the first platform and the second platform, selecting a first content item included in the first plurality of content items to deliver to the addressable user, delivering the first content item to the addressable user in accordance with the third identification to consume the first inventory, and generating a log to record the delivering of the first content item to the addressable user, wherein the log includes the third identification, a fourth identification that identifies the first content item, and a timestamp that is representative of when the first content item was delivered to the addressable user. Computing device 600 can facilitate in whole or in part determining that an addressable user is subscribed to at least a first platform and a second platform that is different from the first platform, assigning an identification that maps to each of the first platform and the second platform, determining that an advertisement associated with a buyer is available to be delivered to the addressable user via the first platform, the second platform, or a combination thereof, in accordance with a first parameter associated with the addressable user and at least a second parameter associated with the first platform, the second platform, or the combination thereof, and responsive to the determining that the advertisement is available, delivering the advertisement to the addressable user in accordance with the identification.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the device, facilitate performance of operations, the operations comprising:
receiving a first inventory that is available on a first platform, where the first inventory includes a first advertising slot that is fillable by a first content item;
obtaining a first identifier associated with the first platform and a second identifier associated with a second platform, wherein each of the first identifier and the second identifier are associated with an addressable user;
generating a data partner identifier that maps to each of the first identifier and the second identifier;
causing the first content item to be delivered to the addressable user by way of the first platform;
generating a log to record the delivering of the first content item to the addressable user by way of the first platform, wherein the log includes the data partner identifier and indicates that the first content item was delivered to the addressable user at a first time;
receiving a second inventory that is available on the second platform, where the second inventory includes a second advertising slot that is fillable by the first content item; and
causing a second content item to be delivered to the addressable user by way of the second platform at a second time that follows the first time, where the second content item is caused to be delivered to the addressable user by way of the second platform rather than the first content item based upon the log indicating that the first content item was delivered to the addressable user by way of the first platform within a time threshold from a current time.

2. The device of claim 1, wherein the operations comprise obtaining first parameters associated with the first inventory, wherein the causing the first content item to be delivered to the addressable user by way of the first platform comprises causing the first content item to be delivered to the addressable user according to the first parameters.

3. The device of claim 2, wherein the first parameters comprise one of minimum price, maximum price, duration, length of time for bid, or target demographic.

4. The device of claim 2, wherein the operations comprise obtaining second parameters associated with the second inventory, wherein causing the second content item to be delivered to the addressable user by way of the second platform comprises causing the second content item to be delivered to the addressable user according to the second parameters.

5. The device of claim 4, wherein the second parameters comprise one of minimum price, maximum price, duration, length of time for bid, or target demographic.

6. The device of claim 1, wherein the operations comprise determining a time period between the first time and the current time, wherein causing the second content item to be delivered to the addressable user comprises causing the second content item to be delivered the addressable user in response to determining the time period exceeds a second time threshold.

7. The device of claim 1, wherein the operations comprise obtaining household information associated with addressable user.

8. The device of claim 7, wherein causing the first content item to be delivered to addressable user by way of the first platform comprises causing the first content item to be delivered to the addressable user according to the household information.

9. The device of claim 7, wherein causing the second content item to be delivered to the addressable user by way of the second platform comprises causing the second content item to be delivered to the addressable user according to the household information.

10. A non-transitory, machine-readable medium, comprising executable instructions that, when executed by a processing system including a processor, facilitate performance of operations, the operations comprising:

receiving a first inventory that is available on a first platform, where the first inventory includes a first advertising slot that is fillable by a first content item;

obtaining a first identifier associated with the first platform of a plurality of platforms and a second identifier associated with a second platform of the plurality of platforms, wherein each of the first identifier and the second identifier are associated with an addressable user;

generating a data partner identifier that maps to each of the first identifier and the second identifier;

obtaining household information associated with the addressable user;

causing the first content item to be delivered to the addressable user by way of the first platform according to the data partner identifier and the household information;

generating a log to record the delivering of the first content item to the addressable user by way of the first platform, wherein the log includes the data partner identifier and indicates that the first content was delivered to the addressable user at a first time;

receiving a second inventory that is available on the second platform, where the second inventory includes a second advertising slot that is fillable by the first content item; and causing a second content item to be delivered to the addressable user by way of the second platform and at a second time, where the second content item is caused to be delivered to the addressable user according to the data partner identifier accessed from the log and the household information, and further where the second content item is caused to be delivered to the addressable user by way of the second platform based upon the log indicating that the first content item was delivered to the addressable user by way of the first platform within a time threshold from a current time.

11. The non-transitory, machine-readable medium of claim 10, wherein the operations comprise obtaining first group of parameters associated with the first inventory, wherein causing the first content item to be delivered to the addressable user by way of the first platform comprises causing the first content item to be delivered to the addressable user according to the first parameters.

12. The non-transitory, machine-readable medium of claim 11, wherein the first parameters comprise one of minimum price, maximum price, duration, length of time for bid, or target demographic.

13. The non-transitory, machine-readable medium of claim 10, wherein the operations comprise obtaining second parameters associated with the second inventory, wherein causing the second content item to be delivered to the addressable user by way of the second platform comprises causing the second content item to be delivered to the addressable user according to the second parameters.

14. The non-transitory, machine-readable medium of claim 13, wherein the second parameters comprise one of minimum price, maximum price, duration, length of time for bid, or target demographic.

15. The non-transitory, machine-readable medium of claim 10, wherein the operations comprise determining a time period between the first time and a current time, wherein causing the second content item to be delivered to the addressable user by way of the second platform comprises causing the second content item to be delivered to the addressable user by way of the second platform in response to determining the time period exceeds a second time threshold.

16. A method, comprising:
receiving, by a processing system including a processor, a first inventory that is available on a first platform, where the first inventory includes a first advertising slot that is fillable by a first content item;

obtaining, by the processing system, a first identifier associated with the first platform and a second identifier associated with a second platform, wherein each of the first identifier and the second identifier are associated with an addressable user;

generating, by the processing system, a data partner identifier that maps to each of the first identifier and the second identifier;

obtaining, by the processing system, first parameters associated with the first inventory;

delivering, by the processing system and by way of the first platform, the first content item to the addressable user according to the data partner identifier and the first group of parameters;

generating, by the processing system, a log to record the delivering of the first content item to the addressable user by way of the first platform, wherein the log includes the data partner identifier and a first time, the first time indicative of when the first content item was delivered to the addressable user by way of the first platform;

receiving, by the processing system, a second inventory that is available on a second platform, where the second inventory includes a second advertising slot that is fillable by a second content item;

obtaining, by the processing system, second parameters associated with the second inventory; and delivering, by the processing system, the second content item to the addressable user by way of the second platform according to the data partner identifier accessed from the log and the second parameters, where the second content item is delivered to the addressable user by way of the second platform based upon an amount of time between a current time and the first time being beneath a time threshold.

17. The method of claim 16, wherein each of the first parameters and the second parameters comprise one of minimum price, maximum price, duration, length of time for bid, or target demographic.

18. The method of claim 16, further comprising obtaining, by the processing system, household information associated with the addressable user.

19. The method of claim 18, wherein the delivering of the first content item by way of the first platform comprises delivering, by the processing system, the first content item to the addressable user by way of the first platform according to the household information.

20. The method of claim 18, wherein the delivering of the second content item by way of the second platform comprises delivering, by the processing system, the second content item to the addressable user by way of the second platform according to the household information.

* * * * *